US009350013B2

(12) United States Patent
Teraoka et al.

(10) Patent No.: US 9,350,013 B2
(45) Date of Patent: *May 24, 2016

(54) METHOD FOR PRODUCING ELECTRODE ASSEMBLY

(71) Applicant: SEIKO EPSON CORPORATION, Tokyo (JP)

(72) Inventors: Tsutomu Teraoka, Matsumoto (JP); Sukenori Ichikawa, Suwa (JP); Hirofumi Hokari, Chino (JP); Tomofumi Yokoyama, Kai (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/172,006

(22) Filed: Feb. 4, 2014

(65) Prior Publication Data

US 2014/0216631 A1 Aug. 7, 2014

(30) Foreign Application Priority Data

Feb. 5, 2013 (JP) ................................ 2013-020419

(51) Int. Cl.
*H01M 4/88* (2006.01)
*H01M 8/12* (2006.01)
(Continued)

(52) U.S. Cl.
CPC .............. *H01M 4/1391* (2013.01); *B32B 5/16* (2013.01); *C04B 35/01* (2013.01); *C04B 35/64* (2013.01);
(Continued)

(58) Field of Classification Search
CPC ..... H01M 4/1391; H01M 4/043; H01M 4/88; H01M 4/13; H01M 4/139; H01M 4/131; H01M 4/64; B32B 5/16; B32B 2255/04; B32B 2260/025; B32B 37/06; B32B 37/24; B32B 2038/0064; B32B 38/08; C04B 35/01; C04B 35/64; C04B 37/00
See application file for complete search history.

(56) References Cited

U.S. PATENT DOCUMENTS 5,709,969 A 1/1998 Yamahira
6,207,098 B1 * 3/2001 Nakanishi et al. ............ 264/414
(Continued)

FOREIGN PATENT DOCUMENTS

JP 08-180904 A 7/1996
JP A-2000-311710 11/2000
(Continued)

OTHER PUBLICATIONS

Molenda, "Modification in the Electronic Structure of Cobalt Bronze LixCoO2 and the Resulting Electrochemical Properties", Solid State Ionics, vol. 36, pp. 53-58, published 1989.*
(Continued)

*Primary Examiner* — Alex Efta
(74) *Attorney, Agent, or Firm* — Oliff PLC (57) ABSTRACT

A method for producing an electrode assembly includes: obtaining a porous active material molded body by molding a constituent material containing a lithium multiple oxide in the form of particles by compression, and then performing a heat treatment at a temperature of 850° C. or higher and lower than the melting point of the used lithium multiple oxide; forming a solid electrolyte layer by applying a liquid containing a constituent material of an inorganic solid electrolyte to the surface of the active material molded body including the inside of each pore of the active material molded body, and then performing a heat treatment; and bonding a current collector to the active material molded body exposed from the solid electrolyte layer.

8 Claims, 7 Drawing Sheets

(51) Int. Cl.
- *H01M 4/86* (2006.01)
- *H01M 8/02* (2006.01)
- *C04B 37/00* (2006.01)
- *H01M 4/1391* (2010.01)
- *H01M 4/04* (2006.01)
- *H01M 4/13* (2010.01)
- *H01M 4/139* (2010.01)
- *B32B 5/16* (2006.01)
- *C04B 35/01* (2006.01)
- *C04B 35/64* (2006.01)
- *B29C 65/00* (2006.01)
- *H01M 4/131* (2010.01)
- *H01M 4/64* (2006.01)
- *B32B 38/00* (2006.01)
- *B32B 38/08* (2006.01)
- *B32B 37/06* (2006.01)
- *H01M 10/052* (2010.01)
- *H01M 10/0562* (2010.01)

(52) U.S. Cl.
CPC ............ *C04B 37/00* (2013.01); *H01M 4/0433* (2013.01); *H01M 4/0471* (2013.01); *H01M 4/13* (2013.01); *H01M 4/139* (2013.01); *B32B 37/06* (2013.01); *B32B 38/08* (2013.01); *B32B 2038/0064* (2013.01); *B32B 2255/04* (2013.01); *B32B 2260/025* (2013.01); *H01M 4/131* (2013.01); *H01M 4/64* (2013.01); *H01M 10/052* (2013.01); *H01M 10/0562* (2013.01); *Y02E 60/122* (2013.01); *Y02P 70/54* (2015.11)

(56) References Cited

U.S. PATENT DOCUMENTS

| | | | |
|---|---|---|---|
| 7,332,108 B2 * | 2/2008 | Chartier et al. | 252/519.1 |
| 2004/0096745 A1 | 5/2004 | Shibano et al. | |
| 2009/0166907 A1 * | 7/2009 | Wang et al. | 264/40.1 |
| 2011/0045355 A1 * | 2/2011 | Ichikawa | 429/231.95 |
| 2014/0216631 A1 | 8/2014 | Teraoka et al. | |
| 2014/0216632 A1 | 8/2014 | Ichikawa et al. | |
| 2014/0220436 A1 | 8/2014 | Yokoyama et al. | |

FOREIGN PATENT DOCUMENTS

| | | |
|---|---|---|
| JP | A-2001-68149 | 3/2001 |
| JP | A-2004-179158 | 6/2004 |
| JP | A-2006-260887 | 9/2006 |
| JP | A-2006-277997 | 10/2006 |
| JP | A-2008-226666 | 9/2008 |
| JP | A-2009-215130 | 9/2009 |
| JP | B2-4615339 | 1/2011 |
| JP | A-2011-204511 | 10/2011 |
| JP | A-2012-188312 | 10/2012 |
| WO | WO 2013130983 A2 * | 9/2013 |

OTHER PUBLICATIONS

Pending U.S. Appl. No. 14/172,024, filed Feb. 4, 2014.
Molenda et al., "Modification In The Electronic Structure Of Cobalt Bronze LixCoO2 And the Resulting Electrochemical Properties," Solid State Ionics, vol. 36, pp. 53-58, 1989.
U.S. Appl. No. 14/172,431, filed Feb. 4, 2014 in the name of Ichikawa.
Jan. 14, 2016 Office Action issued in U.S. Appl. No. 14/172,431.

* cited by examiner

METHOD FOR PRODUCING ELECTRODE ASSEMBLY

BACKGROUND

1. Technical Field

The present invention relates to a method for producing an electrode assembly.

2. Related Art

As a power source for many electronic devices such as portable information devices, a lithium battery (including a primary battery and a secondary battery) has been used. The lithium battery includes a positive electrode, a negative electrode, and an electrolyte layer which is disposed between the layers of these electrodes and mediates conduction of lithium ions.

Recently, as a lithium battery having a high energy density and safety, an all-solid-state lithium battery using a solid electrolyte as a constituent material of an electrolyte layer has been proposed (see, for example, JP-A-2006-277997, JP-A-2004-179158, and Japanese Patent No. 4615339).

As the lithium battery, a high-power and high-capacity lithium battery has been demanded, however, an all-solid-state lithium battery in the related art does not have sufficient performance, and a further improvement has been demanded.

SUMMARY

An advantage of some aspects of the invention is to provide a method for producing an electrode assembly, which is preferably used in a lithium battery and can form a high-power and high-capacity lithium battery.

An aspect of the invention provides a method for producing an electrode assembly, including: obtaining a porous active material molded body by molding a constituent material containing a lithium multiple oxide in the form of particles by compression, and then performing a heat treatment at a temperature of 850° C. or higher and lower than the melting point of the used lithium multiple oxide; forming a solid electrolyte layer by applying a liquid containing a constituent material of an inorganic solid electrolyte to the surface of the active material molded body including the inside of each pore of the active material molded body, and then performing a heat treatment; and bonding a current collector to the active material molded body exposed from the solid electrolyte layer.

According to this method, a porous active material molded body can be easily obtained, and the obtained active material molded body shows favorable conductive properties. Further, a solid electrolyte layer filled in the pores of the active material molded body can be easily formed.

Further, according to this method, as compared with the case where the solid electrolyte layer is not formed in the pores of the active material molded body, a contact area between the active material molded body and the solid electrolyte layer is increased, and thus an interfacial impedance between the active material molded body and the solid electrolyte layer can be decreased. Therefore, in an electrode structure body, favorable charge transfer at an interface between the active material molded body and the solid electrolyte layer can be achieved.

Further, in the electrode assembly obtained by this method, a contact area between the active material molded body and the solid electrolyte layer (a second contact area) can be easily made larger than a contact area between the current collector and the active material molded body (a first contact area). Accordingly, when an electron transfer pathway connecting the current collector, the active material molded body, and the solid electrolyte layer is taken into account, a bottleneck of the charge transfer at an interface between the active material molded body and the solid electrolyte layer is easily eliminated, and thus, an electrode assembly capable of achieving favorable charge transfer can be formed.

Therefore, with the use of the method for producing an electrode assembly according to the aspect of the invention, an electrode assembly which can achieve favorable charge transfer and also can form a high-power lithium battery can be easily produced.

In one aspect of the invention, the production method may be configured such that the method further includes polishing one surface of a composite body having the solid electrolyte layer formed on the active material molded body before the bonding the current collector, and in the bonding the current collector, the current collector is bonded to the active material molded body exposed from the solid electrolyte layer on the polished surface formed in the polishing.

According to this method, the active material molded body can be reliably exposed from the composite body, and therefore, the current collector can be reliably bonded to the active material molded body.

In one aspect of the invention, the production method may be configured such that the constituent material containing a lithium multiple oxide contains a lithium multiple oxide in the form of particles and a pore-forming material which is an organic material in the form of particles.

According to this method, the amount of the pores of the active material molded body can be easily controlled, and thus, the porosity of the porous active material molded body can be easily controlled.

The term "porosity" as used herein refers to the ratio of the volume of voids (pores) contained in the active material molded body to the total volume of the porous active material molded body.

In one aspect of the invention, the production method may be configured such that the pore-forming material contains first particles composed of a material having deliquescence.

According to this method, when the first particles deliquesce, water present around the first particles functions as a binder for binding the lithium multiple oxide in the form of particles, and therefore, the shape can be maintained during a period when the lithium multiple oxide in the form of particles is press-molded, and then subjected to a heat treatment. Due to this, the active material molded body can be obtained without adding another binder or while reducing the addition amount of a binder, and a high-capacity electrode assembly can be easily formed.

In one aspect of the invention, the production method may be configured such that the first particles are composed of polyacrylic acid.

Polyacrylic acid is easily molded into particles and also has deliquescence, and therefore can be favorably used as the pore-forming material.

In one aspect of the invention, the production method may be configured such that the pore-forming material further contains second particles composed of a material having no deliquescence.

According to this method, it becomes easy to handle the pore-forming material. Further, when the pore-forming material has deliquescence, the porosity of the active material molded body may deviate from the predetermined value depending on the amount of water around the pore-forming material. However, when the pore-forming material simultaneously contains the second particles which do not deliquesce, the porosity can be prevented from deviating from the predetermined value.

In one aspect of the invention, the production method may be configured such that the lithium multiple oxide is $LiCoO_2$.

According to this method, an electrode assembly having increased output power and capacity can be favorably produced.

In one aspect of the invention, the production method may be configured such that the inorganic solid electrolyte is $Li_{0.35}La_{0.55}TiO_3$.

According to this method, an electrode assembly having increased output power and capacity can be favorably produced.

BRIEF DESCRIPTION OF THE DRAWINGS

The invention will be described with reference to the accompanying drawings, wherein like numbers reference like elements.

DESCRIPTION OF EXEMPLARY EMBODIMENTS

Electrode Assembly

Figure 1:
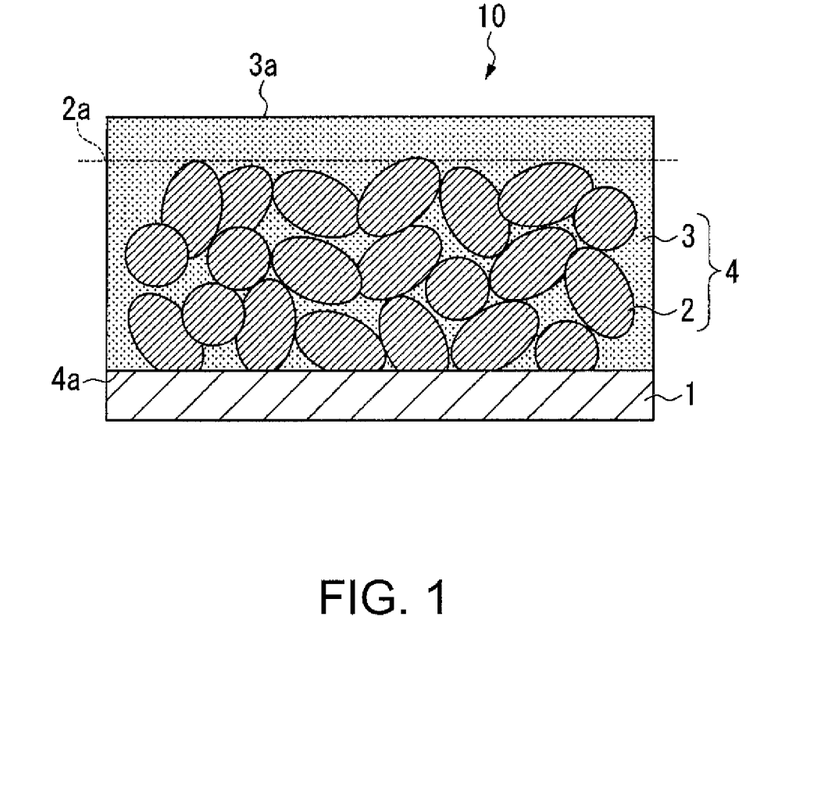
FIG. 1 is a cross-sectional side view showing a main part of an electrode assembly produced by a production method according to an embodiment.

FIG. 1 is a cross-sectional side view showing a main part of an electrode assembly produced by a method for producing an electrode assembly according to this embodiment. In all the drawings described below, in order to make the drawings easily viewable, the dimension, the ratio, etc. of each constituent member is made appropriately different from those of the actual one.

An electrode assembly 10 of this embodiment includes a current collector 1, an active material molded body 2, and a solid electrolyte layer 3. A structure in which the active material molded body 2 and the solid electrolyte layer 3 are combined is referred to as "composite body 4". The electrode assembly 10 is used in a lithium battery as described below.

The current collector 1 is provided in contact with the active material molded body 2 exposed from the solid electrolyte layer 3 on one surface 4a of the composite body 4. As a constituent material of the current collector 1, one type of metal (a metal simple substance) selected from the group consisting of copper (Cu), magnesium (Mg), titanium (Ti), iron (Fe), cobalt (Co), nickel (Ni), zinc (Zn), aluminum (Al) germanium (Ge), indium (In), gold (Au), platinum (Pt), silver (Ag), and palladium (Pd), or an alloy containing two or more types of metal elements selected from this group can be used.

As the shape of the current collector 1, a plate, a foil, a mesh, etc. can be adopted. The surface of the current collector 1 may be smooth, or may have irregularities formed thereon.

The active material molded body 2 is a porous molded body composed of an inorganic electrode active material. A plurality of pores of the active material molded body 2 communicate like a mesh with one another inside the active material molded body 2.

The constituent material of the active material molded body 2 is different between the case where the current collector 1 is used on the positive electrode side and the case where it is used on the negative electrode side in a lithium battery.

In the case where the current collector 1 is used on the positive electrode side, a lithium multiple oxide, which is generally known as a positive electrode active material can be used as the constituent material of the active material molded body 2.

The term "lithium multiple oxide" as used herein refers to an oxide inevitably containing lithium, and also containing two or more types of metal ions as a whole, but free of oxoacid ions.

Examples of such a lithium multiple oxide include $LiCoO_2$, $LiNiO_2$, $LiMn_2O_4$, $Li_2Mn_2O_3$, $LiFePO_4$, $Li_2FeP_2O_7$, $LiMnPO_4$, $LiFeBO_3$, $Li_3V_2(PO_4)_3$, $Li_2CuO_2$, $LiFeF_3$, $Li_2FeSiO_4$, and $Li_2MnSiO_4$. Further, in this specification, solid solutions obtained by substituting some atoms in a crystal of any of these lithium multiple oxides with a transition metal, a typical metal, an alkali metal, an alkaline rare earth element, a lanthanoid, a chalcogenide, a halogen, or the like are also included in the lithium multiple oxide, and any of these solid solutions can also be used as the positive electrode active material.

In the case where the current collector 1 is used on the negative electrode side, a lithium multiple oxide such as $Li_4Ti_5O_{12}$ or $Li_2Ti_3O_7$ which is known as a negative electrode active material can be used as the constituent material of the active material molded body 2.

The active material molded body 2 preferably has a porosity of 10% or more and 50% or less. When the active material molded body 2 has such a porosity, a surface area of the inside of each pore of the active material molded body 2 is increased, and also a contact area between the active material molded body 2 and the solid electrolyte layer 3 is easily increased. Accordingly, the capacity of a lithium battery using the electrode assembly 10 is easily increased.

The porosity can be determined according to the following formula (I) from (1) the volume (apparent volume) of the active material molded body 2 including the pores obtained from the external dimension of the active material molded body 2, (2) the mass of the active material molded body 2, and (3) the density of the active material constituting the active material molded body 2.

Porosity (%)=[1−(mass of active material molded body)/(apparent volume)×(density of active material)]×100    (I)

As will be described in detail below, the porosity of the active material molded body 2 can be controlled using a pore-forming material in a step of forming the active material molded body 2.

The resistivity of the active material molded body 2 is preferably 700 Ω/cm or less. When the active material molded body 2 has such a resistivity, when forming a lithium battery using the electrode assembly 10, a sufficient output power can be obtained.

The resistivity can be determined by adhering a copper foil to be used as the electrode to the surface of the active material molded body, and then, performing DC polarization measurement.

The solid electrolyte layer 3 is composed of a solid electrolyte, and is provided in contact with the surface the active material molded body 2 including the inside of each pore of the active material molded body 2.

Examples of the solid electrolyte include oxides, sulfides, halides, and nitrides such as $SiO_2$—$P_2O_5$—$Li_2O$, $SiO_2$—$P_2O_5$—$LiCl$, $Li_2O$—$LiCl$—$B_2O_3$, $Li_{3.4}V_{0.6}Si_{0.4}O_4$, $Li_{14}ZnGe_4O_{16}$, $Li_{3.6}V_{0.4}Ge_{0.6}O_4$, $Li_{1.3}Ti_{1.7}Al_{0.3}(PO_4)_3$, $Li_{2.88}PO_{3.73}N_{0.14}LiNbO_3$, $Li_{0.35}La_{0.55}TiO_3$, $Li_7La_3Zr_2O_{12}$, $Li_2S$—$SiS_2$, $Li_2S$—$SiS_2$—$P_2S_5$, $LiPON$, $Li_3N$, $LiI$, $LiI$—$CaI_2$, $LiI$—$CaO$, $LiAlCl_4$, $LiAlF_4$, $LiI$—$Al_2O_3$, $LiF$—$Al_2O_3$, $LiBr$—$Al_2O_3$, $Li_2O$—$TiO_2$, $La_2O_3$—$Li_2O$—$TiO_2$, $Li_3N$, $Li_3NI_2$, $Li_3N$—$LiI$—$LiOH$, $Li_3N$—$LiCl$, $Li_6NBr_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$, and $LiSiO_4$—$Li_4ZrO_4$. These solid electrolytes may be crystalline or amorphous. Further, in this specification, a solid solution obtained by substituting some atoms of any of these compositions with a transition metal, a typical metal, an alkali metal, an alkaline rare earth element, a lanthanoid, a chalcogenide, a halogen, or the like can also be used as the solid electrolyte.

The ionic conductivity of the solid electrolyte layer 3 is preferably $1 \times 10^{-5}$ S/cm or more. When the solid electrolyte layer 3 has such an ionic conductivity, ions contained in the solid electrolyte layer 3 at a position away from the surface of the active material molded body 2 reach the surface of the active material molded body 2 and can also contribute to a battery reaction in the active material molded body 2. Accordingly, the utilization of the active material in the active material molded body 2 is improved, and thus the capacity can be increased. At this time, if the ionic conductivity is less than $1 \times 10^{-5}$ S/cm, when the electrode assembly is used in a lithium battery, only the active material in the vicinity of the surface layer of the surface facing a counter electrode contributes to the battery reaction in the active material molded body 2, and therefore, the capacity may be decreased.

The term "ionic conductivity of the solid electrolyte layer 3" as used herein refers to the "total ionic conductivity", which is the sum of the "bulk conductivity", which is the conductivity of the above-mentioned inorganic electrolyte itself constituting the solid electrolyte layer 3, and the "grain boundary ionic conductivity", which is the conductivity between crystal grains when the inorganic electrolyte is crystalline.

The ionic conductivity of the solid electrolyte layer 3 can be determined as follows. A tablet-shaped body obtained by press-molding a solid electrolyte powder at 624 MPa is sintered at 700° C. in an air atmosphere for 8 hours, a platinum electrode having a diameter of 0.5 cm and a thickness of 100 nm is formed on both surfaces of the press-molded body by sputtering, and then, performing an AC impedance method. As the measurement apparatus, an impedance analyzer (model SI1260, manufactured by Solartron Co., Ltd.) is used.

In the composite body 4, when the direction away from the surface of the current collector 1 in the normal direction is defined as the upper direction, the surface 3a on the upper side of the solid electrolyte layer 3 is located above the upper edge position 2a of the active material molded body 2. That is, the solid electrolyte layer 3 is formed above the upper edge position 2a of the active material molded body 2. According to this configuration, when producing a lithium battery having the electrode assembly 10 by providing an electrode on the surface 3a, the electrode provided on the surface 3a and the current collector 1 are not connected to each other through the active material molded body 2, and therefore, a short circuit can be prevented.

As will be described in detail below, one surface 4a of the composite body 4 is a polished surface subjected to a polishing process in the production thereof, and the active material molded body 2 is exposed from the solid electrolyte layer 3. On the surface 4a, an abrasion mark (a polished mark) which is a mark formed by the polishing process is left.

The electrode assembly 10 of this embodiment is formed without using an organic material such as a binder for binding the active materials to each other or a conductive additives for securing the conductive properties of the active material molded body 2 when forming the active material molded body 2, and is composed of almost only an inorganic material. Specifically, in the electrode assembly 10 of this embodiment, a mass loss percentage when the composite body 4 (the active material molded body 2 and the solid electrolyte layer 3) is heated to 400° C. for 30 minutes is 5% by mass or less. The mass loss percentage is preferably 3% by mass or less, more preferably 1% by mass or less, and particularly preferably the mass loss is not observed or is the limit of error. That is, the mass loss percentage when the composite body 4 is heated to 400° C. for 30 minutes is preferably 0% by mass or more.

Since the composite body 4 shows a mass loss percentage as described above, in the composite body 4, a material which is vaporized under predetermined heating conditions such as a solvent or adsorbed water, or an organic material which is vaporized by firing or oxidation under predetermined heating conditions is contained in an amount of only 5% by mass or less with respect to the total mass of the structure.

The mass loss percentage of the composite body 4 can be determined as follows. By using a thermogravimetric/differential thermal analyzer (TG-DTA), the composite body 4 is heated under predetermined heating conditions, and the mass of the composite body 4 after heating under the predetermined heating conditions is measured, and the mass loss percentage is calculated from the ratio between the mass before heating and the mass after heating.

In the electrode assembly 10 of this embodiment, a plurality of pores communicate like a mesh with one another inside the active material molded body 2, and also in the solid portion of the active material molded body 2, a mesh structure is formed. For example, $LiCoO_2$ which is a positive electrode active material is known to have anisotropic electron conductivity in crystals, however, when the active material molded body is tried to be formed using $LiCoO_2$ as a constituent material, in the case where the active material molded body has a configuration such that pores are formed by a mechanical process so as to extend in a specific direction, electron conduction may possibly hardly take place therein depending on the direction on which crystals show electron conductivity. However, if the pores communicate like a mesh with one another as in the case of the active material molded body 2 and the solid portion of the active material molded body 2 has a mesh structure, an electrochemically smooth continuous surface can be formed regardless of the anisotropic electron conductivity or ionic conductivity in crystals. Accordingly, favorable electron conduction can be secured regardless of the type of active material to be used.

Further, in the electrode assembly 10 of this embodiment, since the composite body 4 has a configuration as described above, the addition amount of a binder or a conductive additives contained in the composite body 4 is reduced, and thus, as compared with the case where a binder or a conductive additives is used, the capacity density per unit volume of the electrode assembly 10 is improved.

Further, in the electrode assembly 10 of this embodiment, the solid electrolyte layer 3 is in contact also with the surface of the inside of each pore of the porous active material molded body 2. Therefore, as compared with the case where the active material molded body 2 is not porous or the case where the solid electrolyte layer 3 is not formed in the pores, a contact area between the active material molded body 2 and the solid electrolyte layer 3 is increased, and thus, an interfacial impedance can be decreased. Accordingly, favorable charge transfer at an interface between the active material molded body 2 and the solid electrolyte layer 3 can be achieved.

Further, in the electrode assembly 10 of this embodiment, while the current collector 1 is in contact with the active material molded body 2 exposed on one surface of the composite body 4, the solid electrolyte layer 3 penetrates into the pores of the porous active material molded body 2 and is in contact with the surface of the active material molded body 2 including the inside of each pore and excluding the surface in contact with the current collector 1. It is apparent that in the electrode assembly 10 having such a configuration, a contact area between the active material molded body 2 and the solid electrolyte layer 3 (a second contact area) is larger than a contact area between the current collector 1 and the active material molded body 2 (a first contact area).

If the electrode assembly has a configuration such that the first contact area and the second contact area are the same, since charge transfer is easier at an interface between the current collector 1 and the active material molded body 2 than at an interface between the active material molded body 2 and the solid electrolyte layer 3, the interface between the active material molded body 2 and the solid electrolyte layer 3 becomes a bottleneck of the charge transfer. Due to this, favorable charge transfer is inhibited in the electrode composite as a whole.

However, in the electrode assembly 10 of this embodiment, the second contact area is larger than the first contact area, and therefore, the above-mentioned bottleneck is easily eliminated, and thus, favorable charge transfer can be achieved in the electrode assembly as a whole.

Accordingly, the electrode assembly 10 produced by the production method of this embodiment can improve the capacity of a lithium battery using the electrode assembly 10, and also the output power can be increased.

Method for Producing Electrode Assembly

Next, with reference to FIGS. 2A to 4B, a method for producing the electrode assembly 10 according to this embodiment will be described. FIGS. 2A to 4B are process diagrams showing the method for producing the electrode assembly 10 according to this embodiment.

Figure 2A:
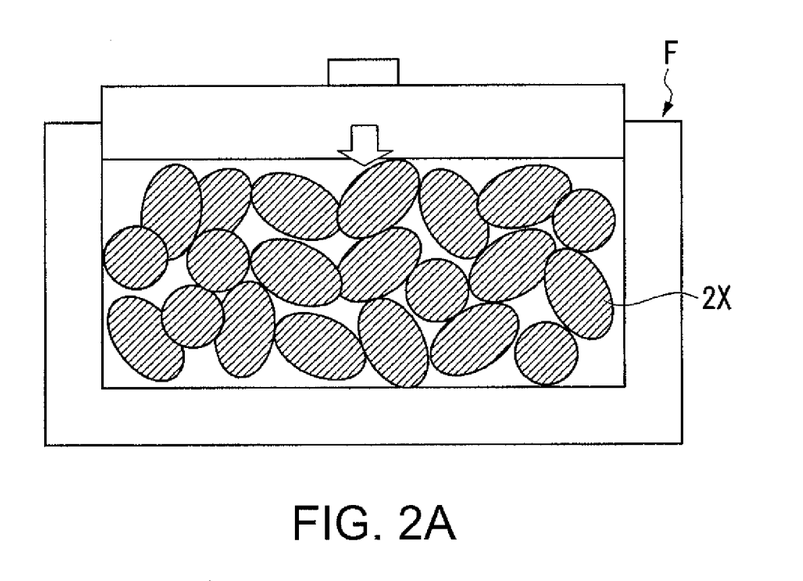
FIGS. 2A and 2B are process diagrams showing a method for producing an electrode assembly according to an embodiment.
Figure 2B:
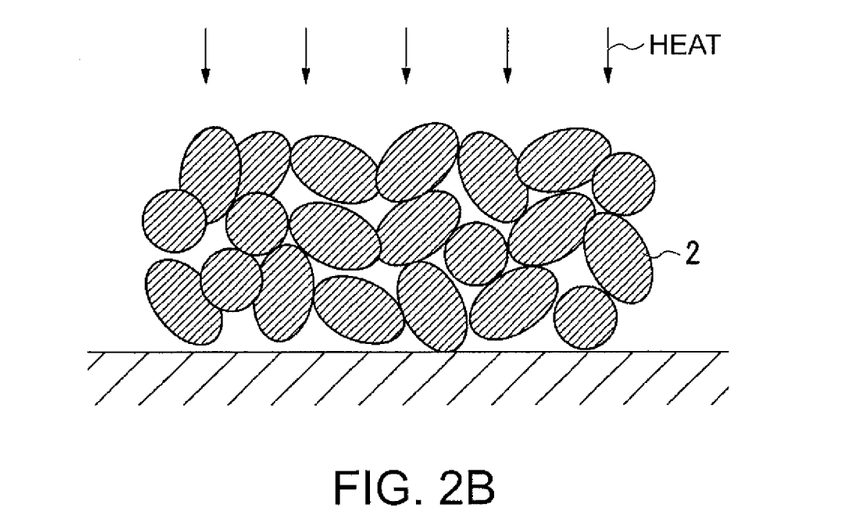

First, as shown in FIGS. 2A and 2B, a constituent material containing a lithium multiple oxide in the form of particles (hereinafter referred to as "active material particles 2X") is molded by compression using a mold F (FIG. 2A), followed by a heat treatment, whereby an active material molded body 2 is obtained (FIG. 2B).

By performing a heat treatment, grain boundary growth in the active material particles 2X and sintering between the active material particles 2X are allowed to proceed so that the retention of the shape of the obtained active material molded body 2 is facilitated, and thus, the addition amount of a binder in the active material molded body 2 can be decreased. Further, a bond is formed between the active material particles 2X by sintering so as to form an electron transfer pathway between the active material particles 2X, and therefore, the addition amount of a conductive additives can also be decreased. As the constituent material of the active material particles 2X, $LiCoO_2$ can be preferably used.

The obtained active material molded body 2 is configured such that a plurality of pores of the active material molded body 2 communicate like a mesh with one another inside the active material molded body 2.

The average particle diameter of the active material particles 2X is preferably 300 nm or more and 5 µm or less. When an active material having such an average particle diameter is used, the porosity of the obtained active material molded body 2 falls within the range of 10% to 40%. As a result, a surface area of the inside of each pore of the active material molded body 2 is increased, and also a contact area between the active material molded body 2 and the solid electrolyte layer 3 is easily increased. Accordingly, the capacity of a lithium battery using the electrode assembly 10 is easily increased.

The average particle diameter of the active material particles 2X can be determined by dispersing the active material particles 2X in n-octanol at a concentration ranging from 0.1 to 10% by mass, and then, measuring the median diameter using a light scattering particle size distribution analyzer (Nanotrac UPA-EX250, manufactured by Nikkiso Co., Ltd.).

If the average particle diameter of the active material particles 2X is less than 300 nm, the pores of the formed active material molded body tend to be small such that the radius of each pore is several tens of nanometers, and it becomes difficult to allow a liquid containing a precursor of the inorganic solid electrolyte to penetrate into each pore in the below-mentioned step. As a result, it becomes difficult to form the solid electrolyte layer 3 which is in contact with the surface of the inside of each pore.

If the average particle diameter of the active material particles 2X exceeds 5 µM, a specific surface area which is a surface area per unit mass of the formed active material molded body is decreased, and thus, a contact area between the active material molded body 2 and the solid electrolyte layer 3 is decreased. Therefore, when forming a lithium battery using the obtained electrode assembly 10, a sufficient output power cannot be obtained. Further, the ion diffusion distance from the inside of the active material particle 2X to the solid electrolyte layer 3 is increased, and therefore, it becomes difficult for the lithium multiple oxide around the center of the active material particle 2X to contribute to the function of a battery.

The average particle diameter of the active material particles 2X is more preferably 450 nm or more and 3 µm or less, further more preferably 500 nm or more and 1 µm or less.

In the constituent material to be used, an organic polymer compound such as polyvinylidene fluoride (PVdF) or polyvinyl alcohol (PVA) may be added as a binder to the active material particles 2X. Such a binder is burned or oxidized in the heat treatment in this step, and the amount thereof is reduced.

Further, to the constituent material to be used, as a pore template when press-molding the powder, a pore-forming material in the form of particles composed of a polymer or a carbon powder may be added. By mixing such a pore-forming material therein, the porosity of the active material molded body can be controlled. Such a pore-forming material is decomposed and removed by burning or oxidation during the heat treatment, and the amount of the pore-forming material is reduced in the obtained active material molded body.

The average particle diameter of the pore-forming material is preferably from 0.5 to 10 μm.

It is preferred that the pore-forming material contains particles (first particles) composed of a material having deliquescence. When the first particles deliquesce, water present around the first particles functions as a binder for binding the lithium multiple oxide in the form of particles, and therefore, the shape can be maintained during a period when the lithium multiple oxide in the form of particles is press-molded, and then subjected to the heat treatment. Due to this, the active material molded body can be obtained without adding another binder or while reducing the addition amount of a binder, and a high-capacity electrode assembly can be easily formed.

Examples of such first particles include particles composed of polyacrylic acid.

It is preferred that the pore-forming material further contains particles (second particles) composed of a material having no deliquescence. It becomes easy to handle the pore-forming material containing such second particles. Further, when the pore-forming material has deliquescence, the porosity of the active material molded body may deviate from the desired predetermined value depending on the amount of water around the pore-forming material. However, by simultaneously incorporating the second particles which do not deliquesce in the pore-forming material, the porosity can be prevented from deviating from the predetermined value.

The heat treatment in this step is performed at a treatment temperature of 850° C. or higher and lower than the melting point of the used lithium multiple oxide. By this heat treatment, the active material particles 2X are sintered with one another, thereby forming an integrated molded body. By performing the heat treatment at a temperature in such a range, an active material molded body 2 having a resistivity of 700 Ω/cm or less can be obtained without adding a conductive additives. Accordingly, when forming a lithium battery using the electrode assembly 10, a sufficient output power can be obtained.

At this time, if the treatment temperature is lower than 850° C., not only sintering does not sufficiently proceed, but also the electron conductivity itself in the crystals of the active material is decreased, and therefore, when forming a lithium battery using the obtained electrode assembly 10, a desired output power cannot be obtained.

Further, if the treatment temperature exceeds the melting point of the lithium multiple oxide, lithium ions are excessively volatilized from the inside of the crystals of the lithium multiple oxide, and therefore, the electron conductivity of the lithium multiple oxide is decreased, and thus, the capacity of the obtained electrode assembly 10 is also decreased.

Accordingly, in order to obtain appropriate output power and capacity, the treatment temperature is preferably 850° C. or higher and lower than the melting point of the lithium multiple oxide, more preferably 875° C. or higher and 1000° C. or lower, and most preferably 900° C. or higher and 920° C. or lower.

Further, the heat treatment in this step is performed for preferably 5 minutes or more and 36 hours or less, more preferably 4 hours or more and 14 hours or less.

Figure 3A:
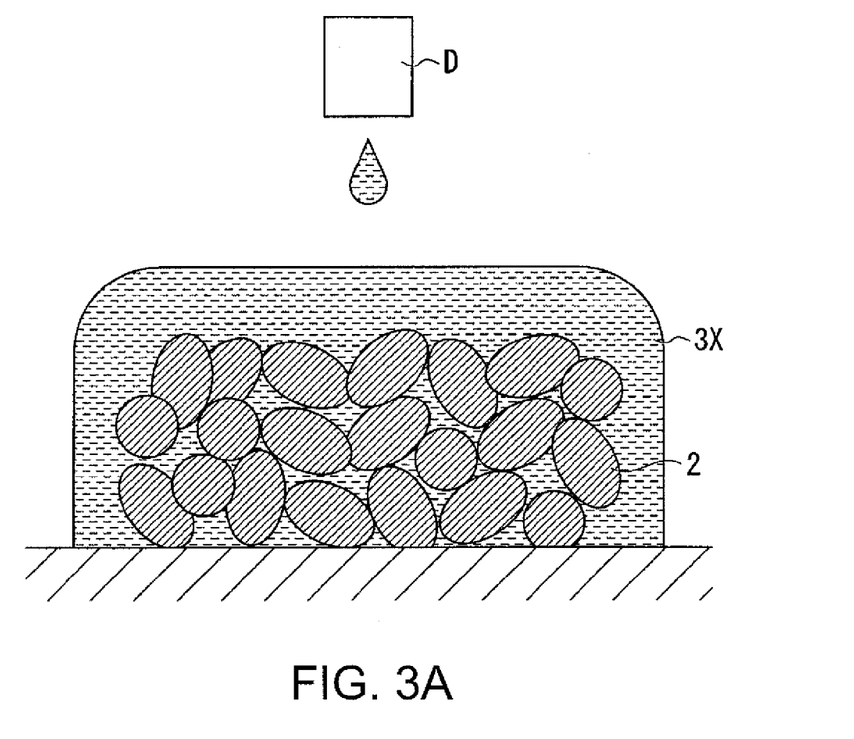
FIGS. 3A and 3B are process diagrams showing a method for producing an electrode assembly according to an embodiment.
Figure 3B:
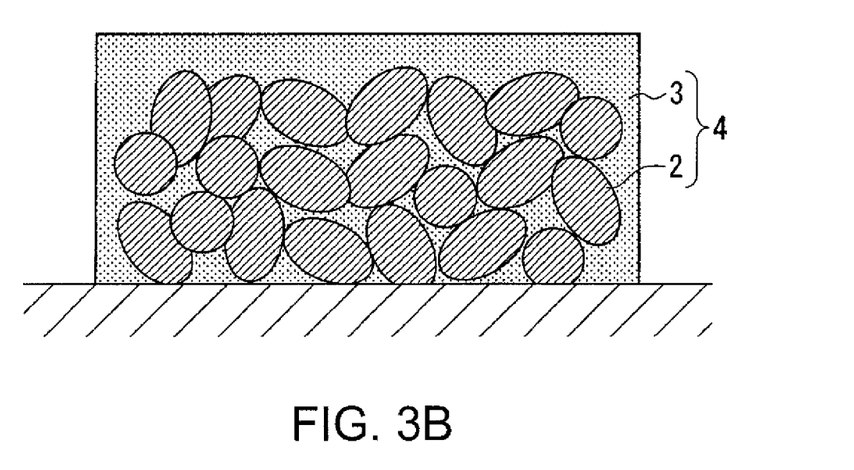

Subsequently, as shown in FIGS. 3A and 3B, a liquid 3X containing a precursor of the inorganic solid electrolyte is applied to the surface of the active material molded body 2 including the inside of each pore of the active material molded body (FIG. 3A), followed by firing to convert the precursor to the inorganic solid electrolyte, whereby the solid electrolyte layer 3 is formed (FIG. 3B).

The liquid 3X may contain a solvent which can dissolve the precursor in addition to the precursor. In the case where the liquid 3X contains a solvent, after applying the liquid 3X, the solvent may be appropriately removed before firing. As the method for removing the solvent, a generally known method such as heating, pressure reduction, or air-blowing, or a method in which two or more such generally known methods are combined can be adopted.

Since the solid electrolyte layer 3 is formed by applying the liquid 3X having fluidity, it becomes possible to favorably form a solid electrolyte also on the surface of the inside of each fine pore of the active material molded body 2. Accordingly, a contact area between the active material molded body 2 and the solid electrolyte layer 3 is easily increased so that a current density at an interface between the active material molded body 2 and the solid electrolyte layer 3 is decreased, and thus, it becomes easy to obtain a high output power.

The liquid 3X can be applied by any of various methods as long as the method can allow the liquid 3X to penetrate into the pores of the active material molded body 2. For example, a method in which the liquid 3X is added dropwise to a place where the active material molded body 2 is placed, a method in which the active material molded body 2 is immersed in a place where the liquid 3X is pooled, or a method in which an edge portion of the active material molded body 2 is brought into contact with a place where the liquid 3X is pooled so that the inside of each pore is impregnated with the liquid 3X by utilizing a capillary phenomenon may be adopted. In FIG. 3A, a method in which the liquid 3X is added dropwise using a dispenser D is shown.

Examples of the precursor include the following precursors (A), (B), and (C):(A) a composition including a salt which contains a metal atom to be contained in the inorganic solid electrolyte at a ratio according to the compositional formula of the inorganic solid electrolyte, and is converted to the inorganic solid electrolyte by oxidation; (B) a composition including a metal alkoxide containing a metal atom to be contained in the inorganic solid electrolyte at a ratio according to the compositional formula of the inorganic solid electrolyte; and (C) a dispersion liquid in which the inorganic solid electrolyte in the form of fine particles or a sol in the form of fine particles containing a metal atom to be contained in the inorganic solid electrolyte at a ratio according to the compositional formula of the inorganic solid electrolyte is dispersed in a solvent, or (A), or (B).

The salt to be contained in the precursor (A) includes a metal complex. Further, the precursor (B) is a precursor when the inorganic solid electrolyte is formed using a so-called sol-gel method.

The precursor is fired in an air atmosphere at a temperature lower than the temperature in the heat treatment for obtaining the active material molded body 2 described above. The firing may be performed at a temperature of 300° C. or higher and 700° C. or lower. By the firing, the inorganic solid electrolyte is produced from the precursor, thereby forming the solid electrolyte layer 3. As the constituent material of the solid electrolyte layer, $Li_{0.35}La_{0.55}TiO_3$ can be preferably used.

By performing firing at a temperature in such a range, a solid phase reaction occurs at an interface between the active material molded body 2 and the solid electrolyte layer 3 due to mutual diffusion of elements constituting the respective members, and the production of electrochemically inactive side products can be suppressed. Further, the crystallinity of the inorganic solid electrolyte is improved, and thus, the ionic conductivity of the solid electrolyte layer 3 can be improved. In addition, at the interface between the active material molded body 2 and the solid electrolyte layer 3, a sintered portion is generated, and thus, charge transfer at the interface is facilitated.

Accordingly, the capacity and the output power of a lithium battery using the electrode assembly 10 are improved.

The firing may be performed by performing a heat treatment once, or may be performed by dividing the heat treatment into a first heat treatment in which the precursor is adhered to the surface of the porous body and a second heat treatment in which heating is performed at a temperature not lower than the treatment temperature in the first heat treatment and 700° C. or lower. By performing the firing by such a stepwise heat treatment, the solid electrolyte layer 3 can be easily formed at a desired position.

Figure 4A:
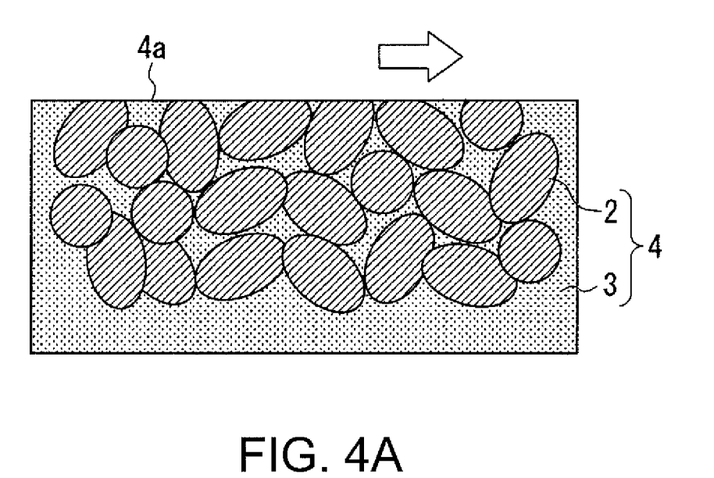
FIGS. 4A and 4B are process diagrams showing a method for producing an electrode assembly according to an embodiment.
Figure 4B:
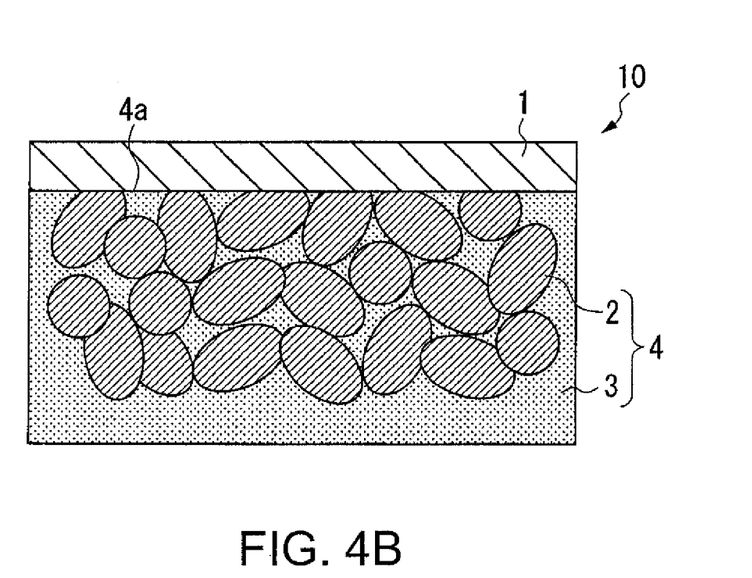

Subsequently, as shown in FIGS. 4A and 4B, the current collector 1 is bonded to the active material molded body 2 exposed on one surface of the composite body 4 including the active material molded body 2 and the solid electrolyte layer 3, whereby the electrode assembly 10 is produced. In this embodiment, after polishing one surface of the composite body 4 (FIG. 4A), the current collector 1 is formed on the surface 4a (polished surface) of the composite body 4 (FIG. 4B).

By polishing the surface 4a of the composite body 4 before bonding the current collector 1 thereto, the active material molded body 2 is reliably exposed on the surface 4a of the composite body 4, and thus, the current collector 1 and the active material molded body 2 can be reliably bonded to each other. On the surface 4a, an abrasion mark (a polished mark) which is a mark formed by the polishing process is left.

Incidentally, the active material molded body 2 may be sometimes exposed on the surface to be in contact with the mounting surface of the composite body 4 when forming the composite body 4. In this case, even if the composite body 4 is not polished, the current collector 1 and the active material molded body 2 can be bonded to each other.

The bonding of the current collector 1 may be performed by bonding the current collector formed as a separate body to the surface 4a of the composite body 4, or may be performed by depositing a constituent material of the current collector 1 described above on the surface 4a of the composite body 4, thereby forming the current collector 1 on the surface 4a of the composite body 4. As the deposition method, a generally known physical vapor deposition method (PVD) or chemical vapor deposition method (CVD) can be adopted.

In the production method according to this embodiment, the objective electrode assembly 10 is produced in this manner.

According to the method for producing the electrode assembly configured as described above, an electrode assembly capable of forming a high-power and high-capacity lithium battery can be easily produced.

MODIFICATION EXAMPLE 1

In this embodiment, the solid electrolyte layer 3 is composed of a single layer, however, it does not matter if a solid electrolyte layer is composed of a plurality of layers.

Figure 5:
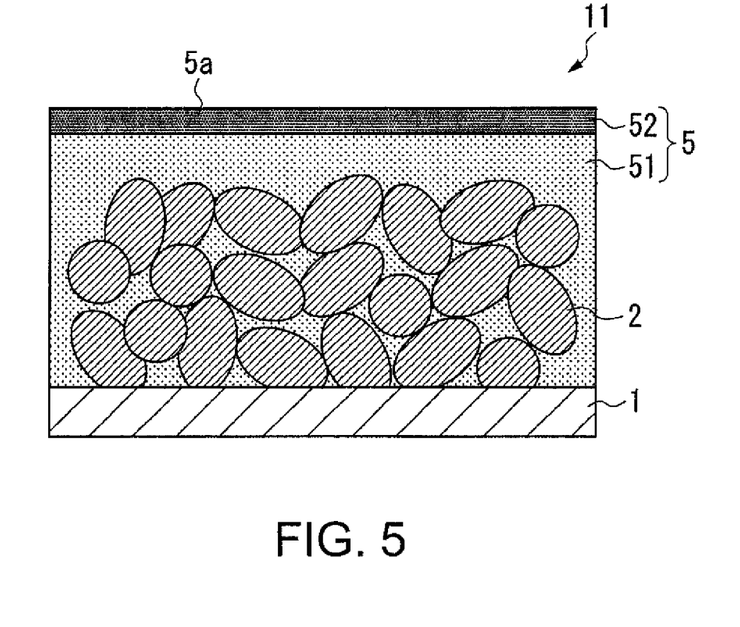
FIG. 5 is a cross-sectional side view showing a modification example of an electrode assembly produced by a production method according to an embodiment.
Figure 6:
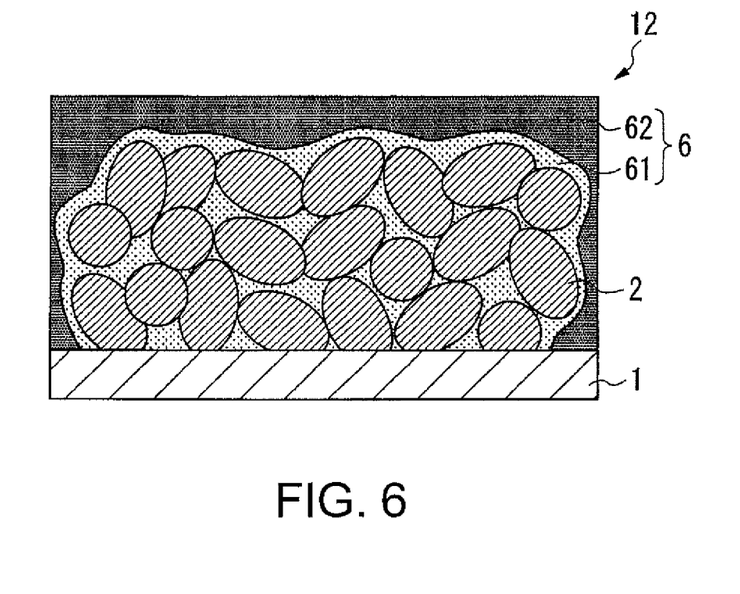
FIG. 6 is a cross-sectional side view showing a modification example of an electrode assembly produced by a production method according to an embodiment.

FIGS. 5 and 6 are cross-sectional side views of a main part showing a modification example of an electrode assembly and are views corresponding to FIG. 1.

An electrode assembly 11 shown in FIG. 5 includes a current collector 1, an active material molded body 2, a first electrolyte layer 51 which is composed of a solid electrolyte and is provided in contact with the surface of the active material molded body 2 including the inside of each pore of the active material molded body 2, and a second electrolyte layer 52 which is provided thinly in contact with the surface of the first electrolyte layer 51. The first electrolyte layer 51 and the second electrolyte layer 52 constitute a solid electrolyte layer 5 as a whole. The solid electrolyte layer 5 is configured such that the volume of the first electrolyte layer 51 is larger than that of the second electrolyte layer 52.

The solid electrolyte layer 5 in which a plurality of layers are laminated can be produced by performing the method for forming the solid electrolyte layer 3 described above per layer. Alternatively, after a liquid for forming the first electrolyte layer 51 is applied, a precursor is adhered by performing a first heat treatment, and then, a liquid for forming the second electrolyte layer 52 is applied, and thereafter, a precursor is adhered by performing the first heat treatment, and then, the adhered precursors in the plurality of layers are subjected to a second heat treatment, whereby the solid electrolyte layer 5 in which a plurality of layers are laminated may be formed.

As the constituent materials of the first electrolyte layer 51 and the second electrolyte layer 52, the same constituent materials as those of the solid electrolyte layer 3 described above can be adopted. The constituent materials of the first electrolyte layer 51 and the second electrolyte layer 52 may be the same as or different from each other. By providing the second electrolyte layer 52, when a lithium battery having the electrode assembly 11 is produced by providing an electrode on the surface 5a of the solid electrolyte layer 5, a short circuit caused by connecting the electrode provided on the surface 5a to the current collector 1 through the active material molded body 2 can be prevented.

Further, when a lithium battery including the electrode assembly 11 is produced, if an alkali metal is selected as the material of an electrode to be formed, depending on an inorganic solid electrolyte constituting the solid electrolyte layer, due to the reducing activity of the alkali metal, the inorganic solid electrolyte constituting the solid electrolyte layer is reduced so that the function of the solid electrolyte layer may be lost. In such a case, when an inorganic solid electrolyte which is stable for the alkali metal is selected as the constituent material of the second electrolyte layer 52, the second electrolyte layer 52 functions as a protective layer for the first electrolyte layer 51, and thus, the degree of freedom of choosing the material of the first electrolyte layer 51 is increased.

In the case where the second electrolyte layer is used as a protective layer for the first electrolyte layer as in the case of the electrode assembly 11, if the electrode assembly has a configuration such that the second electrolyte layer is interposed between the first electrolyte layer and the electrode provided on the surface of the solid electrolyte layer, the volume ratio between the first electrolyte layer and the second electrolyte layer can be appropriately changed.

For example, as an electrode assembly 12 shown in FIG. 6, the electrode assembly may have a configuration such that a solid electrolyte layer 6 includes a first electrolyte layer 61, which is formed thinly in contact with the surface of the active material molded body 2 including the inside of each pore of the active material molded body 2, and also includes a second electrolyte layer 62 which is formed thickly and is provided in contact with the surface of the first electrolyte layer 61, and the volume of the second electrolyte layer 62 is made larger than that of the first electrolyte layer 61.

MODIFICATION EXAMPLE 2

In this embodiment, after forming the composite body 4 in which the active material molded body 2 and the solid electrolyte layer 3 are combined, the current collector 1 is formed on the formed composite body 4, however, the invention is not limited thereto.

Figure 7A:
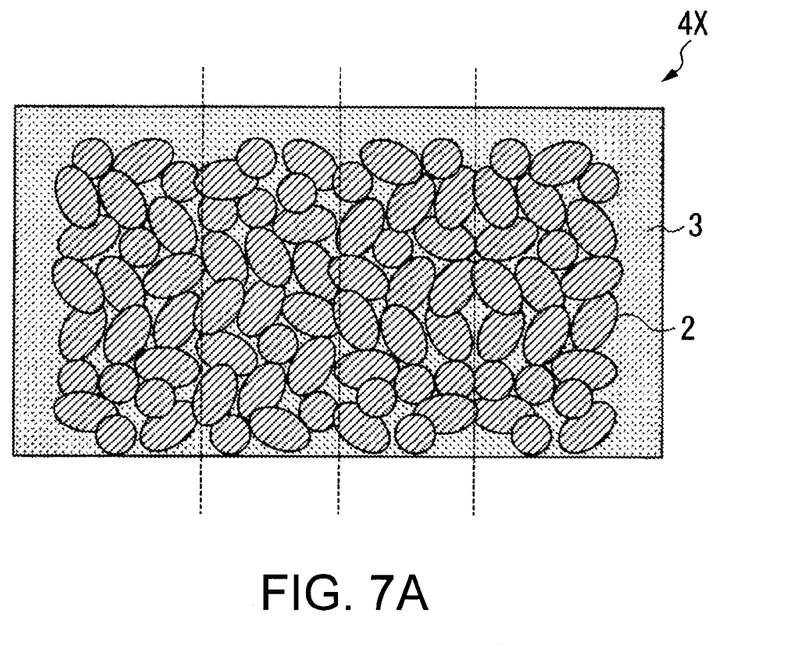
FIGS. 7A and 7B are process diagrams showing a modification example of a method for producing an electrode assembly according to an embodiment.
Figure 7B:
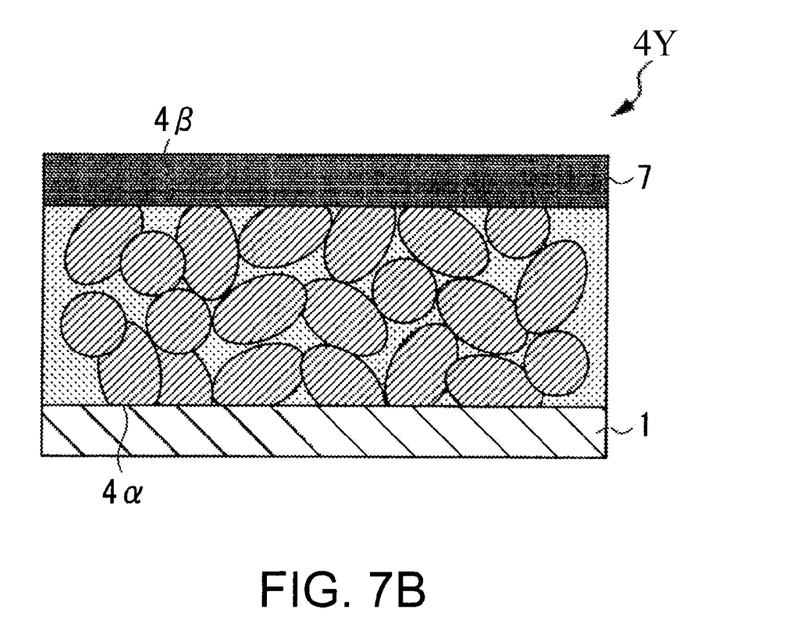

FIGS. 7A and 7B are process diagrams showing a part of a modification example of a method for producing an electrode assembly.

In the method for producing an electrode assembly shown in FIGS. 7A and 7B, first, as shown in FIG. 7A, a bulk body 4X of a structure body in which an active material molded body 2 and a solid electrolyte layer 3 are combined is formed, and then, the bulk body 4X is divided into a plurality of segments in accordance with the size of the objective electrode assembly. In FIG. 7A, a division position is indicated by a broken line, and the drawing shows that the bulk body 4X is divided by cleaving in the direction intersecting the longitudinal direction of the bulk body 4X at a plurality of positions in the longitudinal direction of the bulk body 4X so that the plurality of divided surfaces face each other.

Subsequently, as shown in FIG. 7B, in a composite body 4Y obtained by cleaving the bulk body 4X, a current collector 1 is formed on one divided surface 4α thereof. Further, on the other divided surface 4β, an inorganic solid electrolyte layer (a solid electrolyte layer 7) covering the active material molded body 2 exposed on the divided surface 4β is formed. The current collector 1 and the solid electrolyte layer 7 can be formed by the above-mentioned method.

According to the method for producing an electrode assembly having a configuration as described above, by forming the bulk body 4X in advance, the mass production of the electrode assembly capable of forming a high-power lithium battery is facilitated.

Lithium Battery

Next, a lithium battery according to this embodiment will be described.

Figure 8:
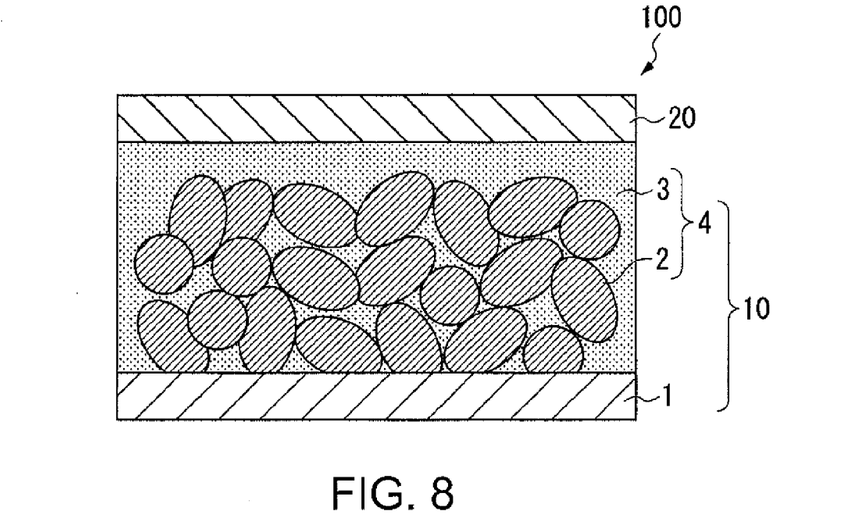
FIG. 8 is a cross-sectional side view showing a main part of a lithium battery according to an embodiment.
Figure 9:
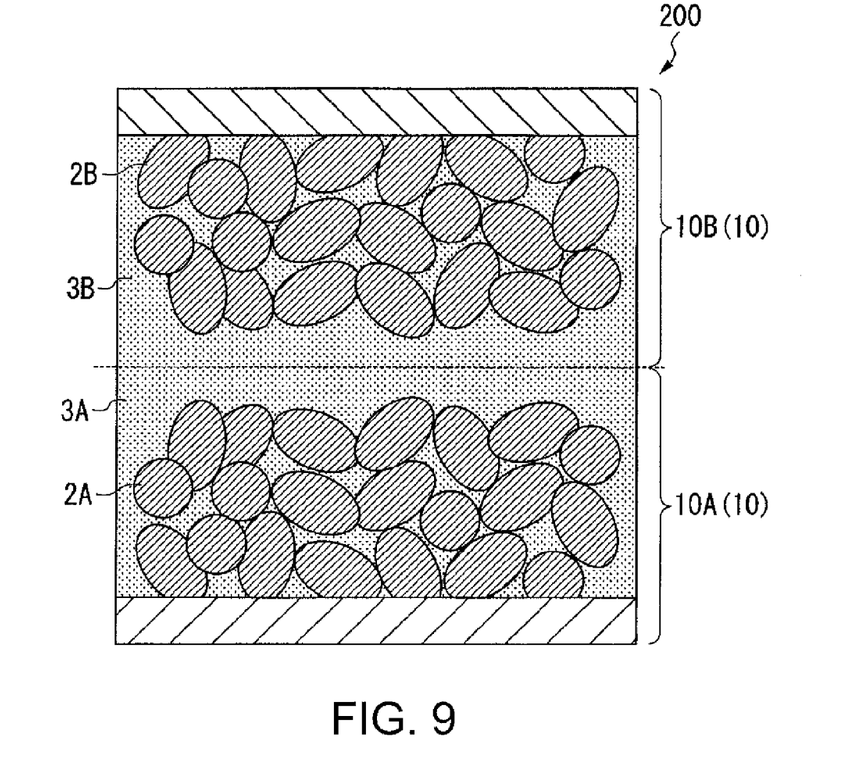
FIG. 9 is a cross-sectional side view showing a main part of a lithium battery according to an embodiment.

FIGS. 8 and 9 are cross-sectional side views showing a main part of a lithium battery according to this embodiment, and are views in a visual field corresponding to FIG. 1.

A lithium battery 100 shown in FIG. 8 includes the above-mentioned electrode assembly 10 and an electrode 20 provided on the surface 3a of the solid electrolyte layer 3 in the electrode assembly 10. In the case where the constituent material of the active material molded body 2 is a positive electrode active material, the current collector 1 serves as a current collector on the positive electrode side, and the electrode 20 serves as a negative electrode. In the case where the constituent material of the active material molded body is a negative electrode active material, the current collector 1 serves as a current collector on the negative electrode side, and the electrode 20 serves as a positive electrode.

For example, in the case where the constituent material of the active material molded body 2 is a positive electrode active material, as the constituent material of the current collector 1, aluminum can be selected, and as the constituent material of the electrode 20 which functions as a negative electrode, lithium can be selected.

According to the lithium battery 100 configured as described above, since the lithium battery uses the electrode assembly 10 produced by the above-mentioned production method, the output power and the capacity can be increased.

In a lithium battery 200 shown in FIG. 9, the above-mentioned electrode assembly 10 is provided on the positive electrode side and the negative electrode side. That is, the lithium battery 200 is provided with an electrode assembly 10A on the positive electrode side and an electrode assembly 10B on the negative electrode side, and is configured such that the solid electrolyte layers of the electrode assembly 10A and the electrode assembly 10B are allowed to abut on each other and integrated with each other.

In the electrode assembly 10A, as the constituent material of an active material molded body 2A, a positive electrode active material is used, and in the electrode assembly 10B, as the constituent material of an active material molded body 23, a negative electrode active material is used.

A solid electrolyte layer 3A in the electrode assembly 10A and a solid electrolyte layer 3B in the electrode assembly 10B may be composed of the same material or different materials.

Also the lithium battery 200 configured as described above can have high output power and high capacity because it uses the electrode assembly 10 produced by the above-mentioned production method.

Hereinabove, preferred embodiments according to the invention are described with reference to the accompanying drawings, however, it is needless to say that the invention is not limited to the embodiments. The shapes of the respective constituent members, combinations thereof, etc. described in the above-mentioned embodiments are merely examples and various modifications can be made based on design requirements, etc. without departing from the gist of the invention.

EXAMPLES

Hereinafter, the invention will be described with reference to Examples, however, the invention is not limited to these Examples.

Example 1

100 Parts by mass of $LiCoO_2$ (manufactured by Sigma-Aldrich Co., Ltd., hereinafter referred to as "LCO") in the form of a powder and 3 parts by mass of polyacrylic acid (PAA) (manufactured by Sigma-Aldrich Co., Ltd.) in the form of a powder were mixed with each other while grinding in a mortar. The PAA in the form of a powder (PAA powder) corresponds to the first particles according to the invention.

80 mg of the thus obtained mixed powder was placed in a die having a diameter of 10 mm and molded into a disk-shaped pellet by applying a pressure. The pellet obtained by molding was sintered by a heat treatment at 1000° C. for 8 hours in an alumina pot in which the LCO powder was placed on the bottom of the pot. In the heat treatment, the temperature increasing rate was set to 3° C./min, and the temperature decreasing rate was set to 3° C./min up to 500° C. In this manner, a porous active material molded body was produced. The obtained active material molded body had a thickness of about 300 μm.

Example 2

A porous active material molded body was produced in the same manner as in Example 1 except that the PAA powder was not used.

Example 3

A porous active material molded body was produced in the same manner as in Example 1 except that 3 parts by mass of poly(methyl methacrylate) (PMMA) (manufactured by Soken Chemical Engineering Co., Ltd., MX500, particle diameter $D_{50}$: 5 μm) in the form of a powder was used in place of the PAA powder. The PMMA in the form of a powder (PMMA powder) corresponds to the second particles according to the invention.

Example 4

A porous active material molded body was produced in the same manner as in Example 1 except that both of the PAA powder (3 parts by mass) and the PMMA powder (3 parts by mass) were used.

The active material molded bodies obtained in Examples 1 to 4 were evaluated for "fragility", "porosity", and "variation in porosity among a plurality of molded bodies (hereinafter referred to as "variation in porosity")". The results are shown in the following Table 1.

As for the "fragility", the evaluation was performed using the yield when producing 100 molded bodies. In Table 1, a case where the yield was 80% or more was evaluated as "A", and a case where the yield was 60% or more and less than 80% was evaluated as "B".

As for the "porosity", the porosity was measured for 100 molded bodies, and the evaluation was performed using an obtained average (arithmetic average) of the porosity. A case where the average of the porosity was 20% or more was evaluated as "A", and a case where the average of the porosity was less than 20% was evaluated as "B".

As for the "variation in porosity", the porosity was measured for 100 molded bodies, and the evaluation was performed using an obtained difference between the minimum value and the maximum value of the porosity. A case where the difference between the minimum value and the maximum value of the porosity was less than 10% was evaluated as "A", a case where the difference between the minimum value and the maximum value of the porosity was 10% or more and less than 20% was evaluated as "B", and a case where the difference between the minimum value and the maximum value of the porosity was 20% or more was evaluated as "C".

TABLE 1

| Example | LCO (parts by mass) | PAA powder (parts by mass) | PMMA powder (parts by mass) | Fragility | Porosity | Variation in porosity |
|---|---|---|---|---|---|---|
| 1 | 100 | 3 | 0 | A | A | B |
| 2 | 100 | 0 | 0 | A | B | C |
| 3 | 100 | 0 | 3 | B | A | B |
| 4 | 100 | 3 | 3 | A | A | A |

As a result of the evaluation, it was found that when the PAA powder (first particles) is used, an active material molded body which is not fragile, shows a low variation in porosity, and thus is favorable can be obtained. It was also found that when the PMMA powder (second particles) is used in combination with the PAA powder, the variation in porosity can be further suppressed.

Incidentally, in a separate investigation, it was confirmed that when an active material molded body is produced in the same manner as in Example 1 except that the amount of the PAA powder is increased to 6 parts by mass or 9 parts by mass, the porosity can be increased, but the increment of the porosity with respect to the increment of the amount of the PAA powder shows a saturation tendency when the amount of the PAA powder is in a range from 3 parts by mass to 9 parts by mass.

Example 5

0.799 g of amorphous titania (manufactured by Sigma-Aldrich Co., Ltd.) in the form of a powder was dissolved in 35 ml of an aqueous solution of 30% $H_2O_2$. To the thus obtained aqueous solution, 9 ml of an aqueous solution of 35% $NH_3$ was added, and the resulting mixture was left to stand for 1 hour while cooling with water.

To the thus obtained aqueous solution, 2.10 g of citric acid monohydrate (manufactured by Kanto Chemical Co., Inc.) was added, and the resulting mixture was stirred while heating to 60° C. for 30 minutes.

The thus obtained aqueous solution was evaporated to dryness. To the deposited solid, pure water was added and the solid was dissolved therein, whereby an aqueous solution of ammonium titanium peroxocitrate (hereinafter referred to as "Ti-CA"), which is a pale yellow solution (hereinafter referred to as "Ti-CA aqueous solution"), was obtained. The Ti-CA aqueous solution was prepared at 0.5 mol/kg, and the pH of the aqueous solution at this time was from 6 to 7.

To the Ti-CA aqueous solution, $LiNO_3$ (manufactured by Kanto Chemical Co., Inc.) and La $(NO_3)_3.6H_2O$ (manufactured by Kanto Chemical Co., Inc.) were added so that the metal atoms were contained at a compositional ratio according to the compositional formula of $Li_{0.35}La_{0.55}TiO_3$ (hereinafter referred to as "LLT"). Further, citric acid monohydrate was added thereto to dissolve the metal salt, and then, an aqueous solution of 35% $NH_3$ was added thereto to adjust the pH to about 6 to 7, whereby a liquid containing a precursor in an amount of 0.5 mol/kg in terms of Ti in LLT according to the compositional ratio was prepared.

The active material molded body of Example 1 was impregnated with the thus prepared liquid, and dried at 60° C., and then, further heated to 200° C., whereby the precursor of LLT was adhered to the active material molded body. The procedure from the impregnation of the active material molded body with the liquid to the heating to 200° C. was repeated until the mass of the precursor adhered to the active material molded body reached 15 mg, which is a predetermined amount.

After a predetermined amount of the precursor was adhered to the active material molded body, the entire active material molded body was fired by heating to 700° C., whereby a composite body 1 in which a solid electrolyte layer was formed on the surface of the disk-shaped active material molded body was obtained.

Both of the opposing surfaces of the thus obtained composite body 1 were mechanically polished. The polishing of the surface on the positive electrode side was performed until the active material molded body was exposed on the polished surface in order to achieve electrical contact between the active material molded body and the electrode.

Incidentally, on the negative electrode side, it suffices that sufficient charge transfer through the solid electrolyte is achieved, and therefore, it is not necessary to polish the surface in terms of charge conduction. However, when a secondary battery provided with the composite body 1 is assumed and packaging thereof in a battery case is taken into account, it is considered that the surface is required to be flat and smooth, and therefore, the surface on the negative electrode side was also polished.

Comparative Example 1

2-Propanol (manufactured by Kanto Chemical Co., Inc.), acetic acid (manufactured by Kanto Chemical Co., Inc.), water, lithium acetate (manufactured by Kanto Chemical Co., Inc.), and cobalt acetate (manufactured by Kanto Chemical Co., Inc.) were mixed at a molar ratio of 40:20:40:1:1, whereby a liquid containing a precursor of LCO was prepared.

On the other hand, to the above-prepared Ti-CA aqueous solution, an aqueous solution of La(NO$_3$)$_3$.6H$_2$O and an aqueous solution of LiNO$_3$ were added so that the metal atoms were contained at a compositional ratio according to the compositional formula of LLT. Further, citric acid monohydrate and ethylene glycol (manufactured by Kanto Chemical Co., Inc.) were added thereto, and the resulting mixture was maintained at 40° C. while stirring. The thus obtained aqueous solution was concentrated at room temperature, whereby a precursor of LLT which is transparent red orange and gelatinous was obtained.

100 Parts by mass of a powder obtained by drying the thus obtained gelatinous precursor and 3 parts by mass of the FAA powder were mixed with each other, and the resulting mixture was press-molded into a tablet at 624 mPa. The resulting tablet-shaped body was sintered at 450° C. in an air atmosphere to remove the PAA powder particles, and further treated at 1000° C. for 1 hour, whereby a porous solid electrolyte molded body composed of LLT was produced. It is found that in the thus obtained solid electrolyte molded body, pores having a diameter of 1 μm were regularly arranged three-dimensionally, and the pores were connected to each other.

The obtained solid electrolyte molded body was impregnated with the liquid containing the precursor of LCO, and dried to adhere a predetermined amount of the precursor to the solid electrolyte molded body, and thereafter, the entire body was fired by heating to 800° C., whereby a composite body 2 in which a layer of LCO which is an active material was formed on the surface of the disk-shaped solid electrolyte molded body was obtained.

Both of the opposing surfaces of the obtained composite body 2 were mechanically polished in the same manner as in Example 5.

Charge/Discharge Test

In the composite body, an aluminum plate was bonded to the polished surface on the positive electrode side, whereby an Al electrode was formed.

Further, to the polished surface on the negative electrode side, a liquid composition containing poly (methyl methacrylate) (FNMA) (manufactured by Soken Chemical Engineering Co., Ltd.), LCO, ethylene carbonate (manufactured by Sigma-Aldrich Co., Ltd.), and dimethyl carbonate (manufactured by Sigma-Aldrich Co., Ltd.) was applied and then evaporated to dryness, whereby a lithium-proof layer was formed. Further, a lithium metal foil and a copper foil were laminated in this order from the lithium-proof layer, and the layers were press-bonded to each other, whereby a negative electrode was formed.

As a result of the evaluation, the composite body 1 obtained in Example 5 showed more favorable charge/discharge properties as a battery cell than the composite body 2 obtained in Comparative Example 1. The charge/discharge properties were evaluated using a multi-channel charge/discharge tester (HJ1001SD8, manufactured by Hokuto Denko Corporation) under the driving conditions that the current density was set to 0.1 mA/cm and the upper limit charge voltage was set to 4.2 V in a constant current-constant voltage mode and the lower limit discharge voltage was set to 3.0 V in a constant current mode.

Incidentally, it was confirmed that when the firing temperature of the composite body of Comparative Example 1 is changed from the above-mentioned 800° C. to 900° C. or higher, the charge/discharge properties are deteriorated. It has been confirmed by XRD that a Li atom or a Co atom contained in the precursor of LCO is thermally diffused in the solid electrolyte molded body. Therefore, the cause of the deterioration of the charge/discharge properties described above is considered to be because by changing the firing temperature to 900° C. or higher, a Li atom or a Co atom is thermally diffused, and as a result, the solid electrolyte molded body and the active material molded body do not function as they are designed.

Based on these results, the usefulness of the invention was confirmed.

The entire disclosure of Japanese Patent Application No. 2013-020419, filed Feb. 5, 2013 is expressly incorporated reference herein.

What is claimed is:

1. A method for producing an electrode assembly, comprising:
    obtaining a porous active material molded body by molding a constituent material containing a lithium multiple oxide in the form of particles by compression, and then performing a heat treatment at a temperature of 850° C. or higher and lower than the melting point of the lithium multiple oxide;
    forming a solid electrolyte layer by applying a liquid containing a constituent material of an inorganic solid electrolyte to the surface of the active material molded body including an inside of each pore of the active material molded body, and then performing a heat treatment; and
    bonding a current collector to the active material molded body exposed from the solid electrolyte layer, wherein
    a mass loss when forming the active material molded body and the solid electrolyte layer after heating to 400° C. for 30 minutes is 5% by mass or less.

2. The method for producing an electrode assembly according to claim 1, wherein
    the method further comprises polishing one surface of a composite body having the solid electrolyte layer formed on the active material molded body before the bonding the current collector, and
    in the bonding the current collector, the current collector is bonded to the active material molded body exposed from the solid electrolyte layer on the polished surface formed in the polishing.

3. The method for producing an electrode assembly according to claim 1, wherein the constituent material containing a lithium multiple oxide contains a lithium multiple oxide in the form of particles and a pore-forming material which is an organic material in the form of particles.

4. The method for producing an electrode assembly according to claim 3, wherein the pore-forming material contains first particles composed of a material having deliquescence.

5. The method for producing an electrode assembly according to claim 4, wherein the first particles are composed of polyacrylic acid.

6. The method for producing an electrode assembly according to claim 5, wherein the pore-forming material further contains second particles composed of a material having no deliquescence.

7. The method for producing an electrode assembly according to claim 1, wherein the lithium multiple oxide is LiCoO$_2$.

8. The method for producing an electrode assembly according to claim 1, wherein the inorganic solid electrolyte is Li$_{0.35}$La$_{0.55}$TiO$_3$.

* * * * *